US 9,513,933 B2

(12) United States Patent
Siedel

(10) Patent No.: US 9,513,933 B2
(45) Date of Patent: Dec. 6, 2016

(54) METHOD OF INTERRUPTION OF META LANGUAGE PROGRAM CODE EXECUTION

(75) Inventor: Frank Siedel, Seevetal (DE)

(73) Assignee: NXP B.V., Eindhoven (NL)

( * ) Notice: Subject to any disclaimer, the term of this patent is extended or adjusted under 35 U.S.C. 154(b) by 512 days.

(21) Appl. No.: 13/001,043

(22) PCT Filed: May 28, 2009

(86) PCT No.: PCT/IB2009/052250
§ 371 (c)(1),
(2), (4) Date: Dec. 22, 2010

(87) PCT Pub. No.: WO2009/156884
PCT Pub. Date: Dec. 30, 2009

(65) Prior Publication Data
US 2011/0107312 A1 May 5, 2011

(30) Foreign Application Priority Data
Jun. 27, 2008 (EP) .................................. 08104562

(51) Int. Cl.
*G06F 9/44* (2006.01)
*G06F 9/445* (2006.01)

(52) U.S. Cl.
CPC ..................................... *G06F 9/445* (2013.01)

(58) Field of Classification Search
CPC ............................. G06F 11/3612; G06F 9/445
USPC ........................................................ 717/127
See application file for complete search history.

(56) References Cited

U.S. PATENT DOCUMENTS

| | | | |
|---|---|---|---|
| 4,163,280 A * | 7/1979 | Mori et al. ..................... | 711/207 |
| 6,101,586 A * | 8/2000 | Ishimoto et al. ............. | 711/163 |
| 6,202,208 B1 | 3/2001 | Holiday, Jr. | |
| 6,470,380 B1 * | 10/2002 | Yoshizawa et al. .......... | 709/213 |
| 6,651,080 B1 * | 11/2003 | Liang .................. | G06F 9/45504 717/148 |
| 6,718,539 B1 | 4/2004 | Cohen et al. | |
| 7,334,136 B2 * | 2/2008 | Levy et al. ................... | 713/194 |
| 7,363,536 B1 * | 4/2008 | Gardner et al. ................ | 714/15 |
| 7,581,090 B2 * | 8/2009 | Miyake et al. ............... | 712/244 |
| 2004/0117539 A1 | 6/2004 | Bennett et al. | |
| 2006/0101181 A1* | 5/2006 | Post ..................... | G06F 9/45537 710/266 |
| 2006/0218425 A1* | 9/2006 | Ding et al. .................... | 713/323 |
| 2007/0168996 A1 | 7/2007 | Klein | |

FOREIGN PATENT DOCUMENTS

| | | |
|---|---|---|
| CN | 1833225 A | 9/2006 |
| DE | 10001042 A1 | 7/2001 |
| EP | 1821210 A2 | 8/2007 |
| GB | 2373888 A | 10/2002 |

OTHER PUBLICATIONS

International Search Report for Application PCT/IB2009/052250 (Aug. 11, 2009).

* cited by examiner

*Primary Examiner* — Wei Zhen
*Assistant Examiner* — Lanny Ung

(57) ABSTRACT

The invention relates to a computer implemented method of interruption of meta language program code (10) execution on a computer having a micro controller (1) executing a native code (3) execution with a virtual machine (5) executing a meta language program code (10), where an address controller (15) controls the interruption of the meta language program code (10).

20 Claims, 1 Drawing Sheet

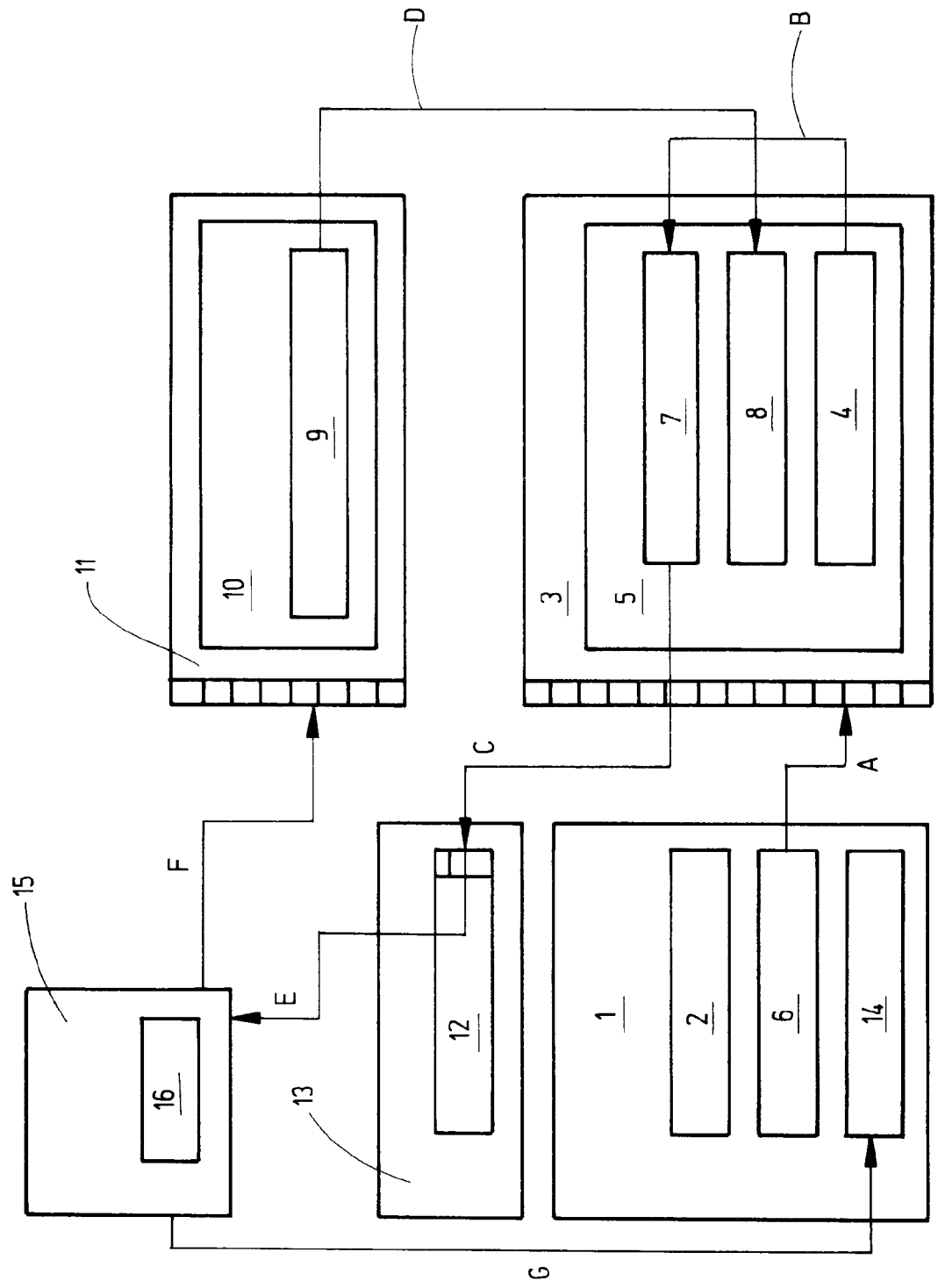

METHOD OF INTERRUPTION OF META LANGUAGE PROGRAM CODE EXECUTION

FIELD OF THE INVENTION

The invention relates to a computer implemented method of interruption of Meta language program code execution as claimed in claim 1.

BACKGROUND OF THE INVENTION

Usually the application of a computer program is hardware dependent. Therefore the program development has to consider different hardware solutions for the same functionality of the software solution which has to be adapted accordingly. In order to be independent from the hardware design the virtual machine concept has been developed in the past. On such a virtual machine a virtual machine code or a so called Meta language program code will be executed. Virtual machine code will be executed on a micro controller using the so called Meta language program code. As an example of such a virtual machine the Java virtual machine is known within the prior art and on such a virtual machine a virtual machine code will be executed. Such virtual machine code or Meta language program code is executed e.g. on micro controllers of Smart Cards or micro controller based identification cards. Such cards are e.g. known as so called Java Cards which use the Java virtual machine internally. Such Smart Cards or Java Cards are typically used to execute e.g. Java applications on Smart Cards in order to perform encryption processes on Smart Cards to create a certain degree of security during the use of such Smart Cards or for identification purposes of the user of the card.

As an example of technological background of the invention EP 1 821 210 A2 discloses a virtual machine environment using a Java virtual machine on top of a hardware dependent platform, where the Java platform is used to execute a Java program.

Sometimes the execution of Meta language code or virtual machine code may contain failures or may lead to failures which might be limited such that the execution of language code containing or creating failures should be replaced by language code without containing or creating such failures.

U.S. Pat. No. 6,202,208 describes a patching environment for modifying a Java virtual machine running on a computer system. The environment comprising a patch data structure on an electronic memory of the computer including as method table, a data item contained in the patch data structure to identify the patch data structure and a second data item associated with each of the identified patches.

OBJECT AND SUMMARY OF THE INVENTION

It is an object of the invention to create a computer implemented method of interruption of Meta language program code execution which allows a replacement e.g. of such Meta language program code or at least part of it.

The object of the invention will be solved by a computer implemented method according to the features of claim 1. The inventive computer implemented method of interruption of Meta language program code execution on a computer including a micro controller which executes a native code implementing a virtual machine executing a Meta language program code comprises the step that an address controller controls the interruption of the Meta language program code execution.

According to the invention it is of advantage that the method furthermore includes that a persistent storage element contains the Meta language program code including Meta language instructions, while a transient storage element contains a register reflecting data of a Meta language program counter.

Furthermore it is of advantage that the method furthermore includes the step that the address controller is able to read the physical address of the Meta language program code stored in the persistent storage element.

It is furthermore of advantage that the method furthermore includes the step of using the address of the register to read the content of the persistent storage element at a specific position.

Additionally it is advantageous that the method furthermore includes the step of comparing the address of the register using an address table.

Furthermore it might be of advantage that the address table is stored in a memory, preferably in a memory of the address controller.

According to an embodiment of the invention it might be helpful that the address controller instructs an exception handler of the micro controller to issue an exception or interruption of the running of the Meta language program code.

BRIEF DESCRIPTION OF THE DRAWINGS

The above and other features and advantages of the invention will be apparent from the following description of an exemplary embodiment of the invention with reference to the accompanying drawings, in which:

FIG. 1 shows a schematic view of a block diagram representing the inventive method.

DESCRIPTION OF EMBODIMENTS

FIG. 1 shows schematically a block diagram representing the invention. Block 1 represents a micro controller. The micro controller 1 contains a micro code 2, a native code program counter 6 and an exception handler 14. The micro controller 1 executes the micro code 2 which is implemented within the micro controller 1. The micro code 2 reflects the native code 3 of a virtual machine loop 4 implementation in the virtual machine 5, which is addressed according to arrow A by the native code program counter 6 of the micro controller 1.

The native code 3 contains a virtual machine implementation 5, which furthermore contains a Meta language program counter 7, a Meta language instruction interpreter 8 and the virtual machine loop 4.

The virtual machine loop 4 implementation controls the Meta language program counter 7 via arrow B. The Meta language program counter 7 is part of the virtual machine 5 which is itself part of the native code 3.

The virtual machine 5 furthermore comprises the Meta language interpretation interpreter 8 which might be controlled by Meta language instructions 9 of block 11. The Meta language instructions interpreter 8 of the virtual machine 5 receives and executes according to arrow D the Meta language instructions 9 of the Meta language code 10 of block 11. The Meta language code 10 is stored within the persistent memory or storage 11 and which is addressed according to arrow B by the Meta language program counter 7. Furthermore the Meta language program counter 7 is mapped according to arrow C on a register 12 in a transient storage or memory 13.

According to FIG. 1 the diagram shows furthermore a transient storage or memory 13, which contains registers 12 which might be addressed and controlled.

FIG. 1 additionally shows an address controller 15, which contains an address table 16. The address controller sends control signals according to arrow G to the exception handler 14 which might raise an exception in the process. These exceptions may lead to a change in Meta language program code in order to replace a part of the original Meta language program code to a replacement Meta language program code.

Furthermore the register 12 is connected to the address controller 15 and/or to the address table 16 according to arrow E. Additionally according to arrow F the address controller 15 and/or to the address table 16 is connected to the persistent storage unit 10 including the meta language code 7 and the meta language instructions 9.

According to the invention a physical address will be stored in the register 12 of the transient storage or memory 13 reflecting the Meta language program counter 7 of the virtual machine 5. Accordingly a set of data reflecting the physical address of the Meta language program counter will be stored in the register 12.

The Meta language program counter 7 is used to read the Meta language instructions 9 of the Meta language code 10 in the persistent storage memory 11. An address controller 15 is able to observe this physical address which is stored in the persistent storage accordingly as indicated by arrow F.

The address of the register 12 is used to read the content of the persistent storage 11 at a specific position. Therefore the address controller 15 compares 15 the address of the register using the address table 16.

In case the current content of the register 12 matches with one entry in the address table the address controller will raise en exception in the exception handler 14 of the micro controller 1 which is used to stop an execution of the meta language instruction interpreter 8 in the virtual machine 3 loop.

This hardware triggered exception allows the possibility to replace existing Meta language code 10 by another implementation, e.g. a patched Meta language code which might be used in case of an invalid Meta language code 10 implementation.

According to the invention the hardware itself observes a Meta language instruction fetch operation and the functionality is transparent to the Meta language instruction interpreter 8 and has no specific impact on the overall performance of the virtual machine 5.

Therefore the above described method allows to replace meta language code of one storage element e.g. an ROM with other new meta language code which is located on an other storage element e.g. on a EEPROM. Therefore the method allows a hardware triggered patch of Meta language code.

In general it is of advantage to use the inventive method to run on a computer. Furthermore it is of advantage to use such method to run on a chip card or smart card to replace virtual machine code originally implemented on the card by other virtual machine code e.g. in case of failure of the originally implemented code.

REFERENCES 1 micro controller
2 micro code
3 native code
4 virtual machine loop
5 virtual machine
6 native code program counter
7 meta language program counter
8 meta language instruction interpreter
9 meta language instructions
10 meta language program code
11 persistent storage, memory
12 register
13 transient storage
14 exception handler
15 address controller
16 address table

The invention claimed is:

1. A method, comprising
using a microcontroller, executing a native code implementing a virtual machine;
and using an interpreter of the virtual machine, executing meta language program code;
using an address controller coupled to the microcontroller, monitoring the meta language program execution and an address table associated with the meta language program code execution, and
controlling interruption of the meta language program code execution by reading the physical address of the meta language program code and, in response, prompting an exception handler of the microcontroller to issue an exception or interruption to stop execution of the meta language program code and then physically replacing at least a portion of the meta language program code with a different portion of program code.

2. The method according to claim 1, wherein
a persistent storage element coupled to the microcontroller contains the Meta language program code including Meta language instructions, and
a transient storage element coupled to the microcontroller contains a register reflecting data of a Meta language program counter.

3. The method according to claim 1, wherein the method furthermore includes that the address controller is able to read a physical address of the Meta language program code stored in a persistent storage element.

4. The method according to claim 1, further comprising using an address of a register to read a content of a persistent storage element at a specific position.

5. The method according to claim 1, further comprising comparing an address of a register using the address table.

6. The method according to claim 5, wherein the address table is stored in a memory of the address controller.

7. The method according to claim 1, further comprising using the address controller, instructing the exception handler of the microcontroller to issue an exception or interruption, which stops the meta language program code execution.

8. The method according to claim 7, wherein
the meta language program code is stored in a persistent memory circuit coupled to the microcontroller; and
the method further includes, in response to stopping the meta language program code execution, effecting the step of physically replacing at least a portion of the meta language program code in the persistent memory circuit, wherein the replacing of the portion of the meta language code stored a different portion of program code in the persistent memory circuit.

9. The method according to claim 8, wherein the address controller monitors the meta language program code execution without affecting performance of said execution.

10. The method according to claim 1, wherein
the meta language program code is stored in a persistent memory circuit coupled to the microcontroller; and
the address controller causes the meta language program code execution to stop and thereafter, while the meta language program code execution is stopped, replaces at least a portion of the meta language program code in the persistent memory circuit, and wherein until the execution is stopped, the address controller monitors the meta language program code execution without affecting performance of said execution.

11. The method according to claim 1, wherein
the native code implementing the virtual machine is stored within the microcontroller; and
the meta language program code is stored in a persistent memory coupled to the microcontroller.

12. The method according to claim 1, wherein the address controller and the microcontroller are used to control interruption of the meta language program code execution by replacing an existing portion of the meta language program code with patched meta language program code.

13. The method of claim 1, wherein
prompting an exception handler of the microcontroller to issue an exception or interruption to stop execution of the meta language program code is performed by the address controller in response to encountering an error in the meta language code; and
the method further comprises dynamically patching the meta language program code to remove a portion of the meta language program code in error by physically replacing the portion of the meta language program code in error with a patched portion of meta language program code that corrects the error.

14. The method of claim 13, wherein
the native code implementing the virtual machine is stored within the microcontroller;
the meta language program code is stored in a first storage element coupled to the microcontroller; and
the patched meta language program code is stored in a second storage element coupled to the microcontroller.

15. An apparatus comprising:
a persistent memory having meta language program code stored therein;
a microcontroller coupled to the persistent memory and configured and arranged to execute a set of native code stored in the microcontroller and that implements a virtual machine, wherein the virtual machine includes
a meta language program counter, and
an interpreter being configured and arranged to execute instructions of meta language program code that are indicated by the meta language program counter; and
an address controller circuit configured and arranged to stop execution of the meta language program code by the interpreter based on a comparison of a value of the program counter and entries in an address table and to then effect physically replacement of at least a portion of the meta language program code with a different portion of program code.

16. The apparatus of claim 15, wherein
the microcontroller includes an exception handler circuit, and
the address controller circuit is configured and arranged to stop execution of the meta language program code by raising an exception in the exception handler circuit.

17. The apparatus of claim 15, wherein the address controller is configured to stop execution of the meta language program code in response to the value of the program counter matching an entry in the address table.

18. The apparatus of claim 15, further comprising a register coupled to the microcontroller; and
wherein the microcontroller is further configured and arranged to store data in the register, the data reflecting a physical address corresponding to the value of the meta language program counter.

19. The apparatus of claim 15, wherein
the microcontroller further includes a native code program counter; and
the microcontroller is configured to execute instructions of the set of native code that are indicated by the native code program counter.

20. A method, comprising
using a microcontroller, executing a native language program code stored in a memory of the microcontroller implementing a virtual machine; and
using an interpreter of the virtual machine, executing meta language program code stored in an external memory element coupled to the microcontroller; and
using an external address controller coupled to the microcontroller,
monitoring the meta language program execution and an address table associated with the meta language program code execution, and
in response to a comparison between a program counter of the virtual machine and the address table indicating an error in the meta language program code, prompting an exception handler of the microcontroller to stop execution of the meta language program code; and
dynamically patching the meta language program code to remove a portion of the meta language program code in error by physically replacing the portion of the meta language program code in error with a patched portion of meta language program code that corrects the error in the external memory element; and
wherein stopping execution of the meta language code, by the exception handler includes generating an interrupt to stop execution of the native language program code by the microcontroller.

* * * * *